(No Model.) 2 Sheets—Sheet 2.
J. WINTER.
HUSKING MACHINE FOR RICE, &c.
No. 509,011. Patented Nov. 21, 1893.
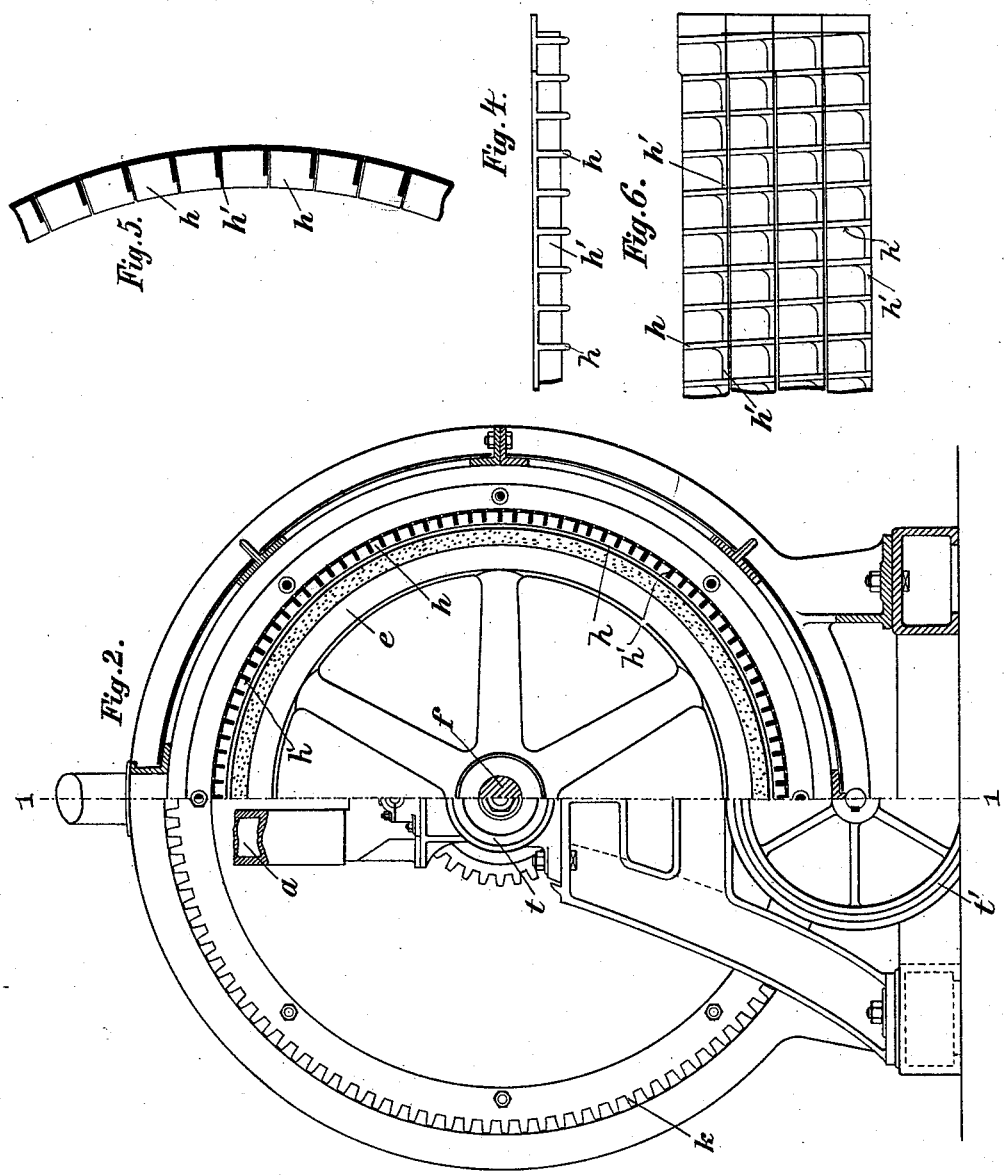
Witnesses:
C. C. Burdine
C. B. Bull
Josef Winter
Inventor,
by Dodge Sons
Attys.

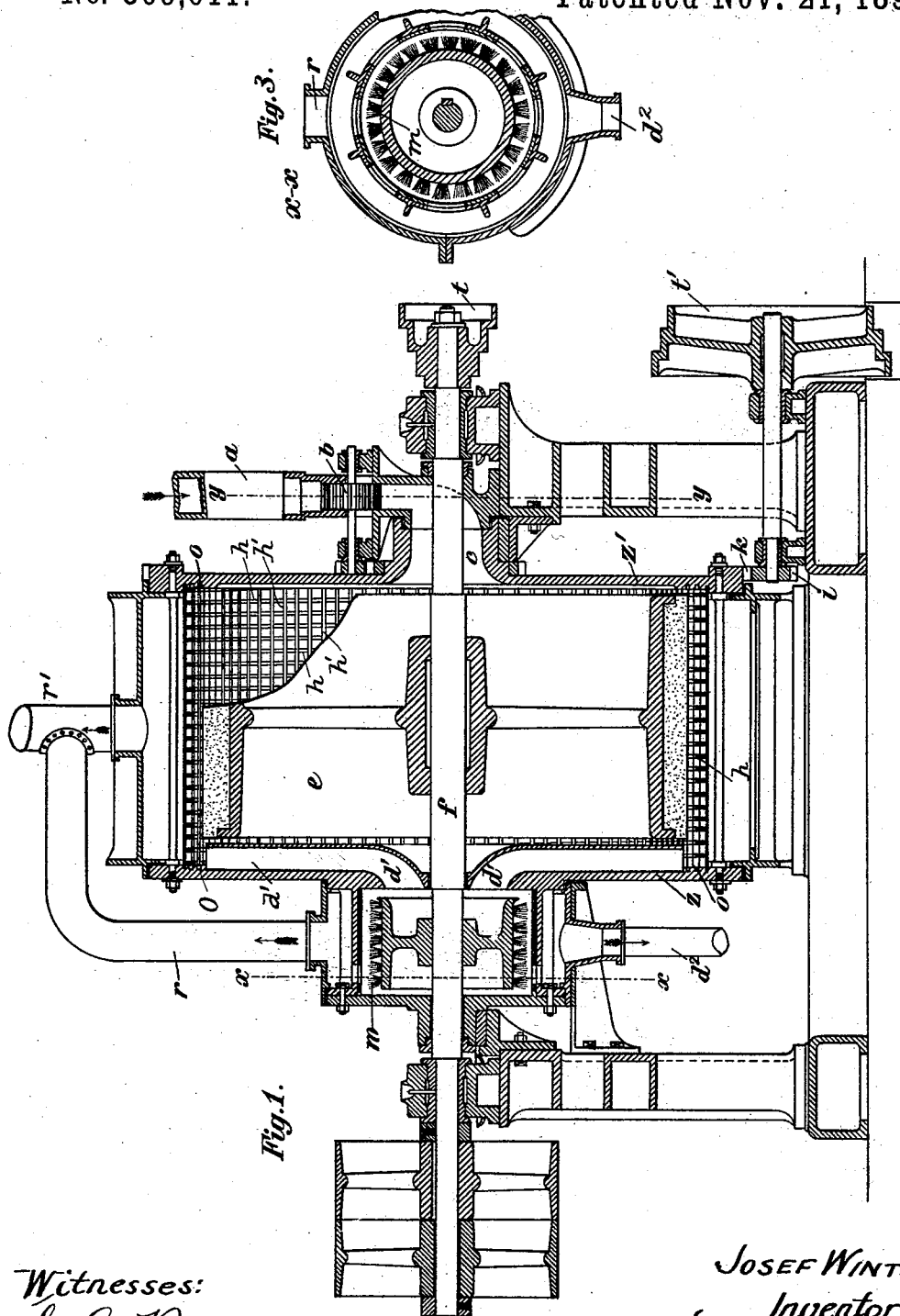

UNITED STATES PATENT OFFICE.

JOSEF WINTER, OF ASCHERSLEBEN, GERMANY.

HUSKING-MACHINE FOR RICE, &c.

SPECIFICATION forming part of Letters Patent No. 509,011, dated November 21, 1893.

Application filed September 28, 1889. Serial No. 325,374. (No model.)

*To all whom it may concern:*

Be it known that I, JOSEF WINTER, manufacturer, of Aschersleben, in the Kingdom of Prussia and German Empire, have invented a new and useful Husking-Machine for Rice, Barley, Peas, Corn, &c., with regulating mechanism for controlling the length of time for husking a certain quantity of grain or other material during a continuous charge and discharge, of which the following is a specification, reference being had therein to the accompanying drawings.

My invention relates to husking or decorticating machines, and consists in various features hereinafter set forth and claimed.

In the drawings, Figure 1 is a longitudinal sectional view of the machine on the line 1—1 of Fig. 2; Fig. 2 an end elevation, partly in section; Fig. 3 a vertical sectional view on the line $x$—$x$ of Fig. 1; Figs. 4, 5, and 6, views illustrating the construction of the rotating cylindrical shell or casing, and Fig. 7 a vertical sectional view on the line $y\ y$ of Fig. 1.

Upon a rotary shaft $f$, which is journaled in suitable bearings in the frame of the machine, is secured the husking wheel or cylinder, comprising in the present instance an open ended cylindrical shell $e$ having a covering of emery, sandstone or the like. This husking wheel or cylinder is inclosed by a box or casing, also journaled in suitable bearings and adapted to turn or rotate in a direction the reverse to that of the husking cylinder. This casing comprises two disks Z and Z having openings at the center through which the material is respectively fed and discharged; said disks being also provided with lateral hollow gudgeons affording a support for the casing, as shown in Fig. 1. Upon the inner face of each disk is a series of annular concentric grooves O to receive the ends of the bars which form the active or working face of the casing,—the bars being held in place by means of suitable tie rods,—shown in Figs. 1 and 2,—connecting the disks. The bars, which are shown in Figs. 4, 5 and 6, comprise a number of inclined transverse ribs $h$ and a series of longitudinal ribs $h'$ which are so arranged as to form a series of cells or pockets. The inclination of the ribs $h$ results in the formation, on the inner face of the rotating shell or casing, of a circumferential spiral channel composed of a number of independent cells. The ribs $h$ are shorter, radially, than the ribs $h'$, hence the grains are prevented from working directly from one end of the machine to the other. When the abrading or husking cylinder wears away, the bars may be set closer to the cylinder,—the annular grooves O permitting such adjustment.

In order to impart motion to the shell or casing (which is itself inclosed) the latter is provided with a gear ring $k$ (Figs. 1 and 2) which meshes with a pinion $i$ secured to a shaft journaled in the frame of the machine,—the said shaft having a band wheel $t'$ to receive a belt from wheel $t$ carried by shaft $f$.

The material to be husked is fed continuously through tube $a$, (Figs. 1, 2 and 7) by means of the feed roller $b$, into and through the hollow gudgeon $c$ of the disk $Z'$ of the rotary casing. The material after working its way over toward the opposite disk Z is delivered or falls into the radial tubes $d'$ on the inner face of the said disk, and passes into the brushing chamber formed by enlarging the gudgeon of said disk Z as shown in Figs. 1 and 3. In this chamber the grain is subjected to the action of brush $m$ secured to shaft $f$, and finally discharged through spout $d^2$,—the dust given off during the brushing as well as that given off during the husking being carried away through the pipes $r$ and $r'$ respectively. In order to permit the dust to escape from the rotating shell or casing, the bars forming the periphery of the same, have narrow recesses along one edge,—see Fig. 6,— which allow the dust to pass outward. When, in the rotation of the shell or casing, one of its cells filled with grain has passed beyond the level of the axis, the grains slip from the cell and fall downward into another cell, are raised by this cell, again discharged, and so on, until they have been carried laterally by the spiral arrangement of the cells over to the discharge side of the machine. It is during their fall from the cells that the grains by dropping upon the periphery of the husking cylinder are subjected to the abrading action of the latter. By giving the ribs $h'$ a suitable shape, the grains may be caused to slip endwise or sidewise from the cells onto the cylinder. Where the ribs are of such shape that the corners of the cells are rounded as in Fig. 6, the grains assume a direction radial to that of the shell or casing, or with their points toward the stone or cylinder; but if the cells have sharp edges the grains will assume a position therein more nearly corresponding to the axis of rotation, and will fall or roll from the cells sidewise upon the cylinder.

What I claim is—

1. In a husking machine, the combination with a rotary abrading cylinder, of an encircling rotary shell or casing having on its inner face a continuous spiral row of cells or pockets.

2. In a husking machine, the combination with a rotary husking cylinder, of an encircling shell comprising two disks and the longitudinal bars having pockets or cells.

3. In combination with the disks Z Z' having each a series of annular grooves, the longitudinal cell bars seated at their ends in the grooves; and the tie rods connecting the disks.

4. In a husking machine, the combination with a husking surface, of a shell or casing having longitudinal bars provided with longitudinal and transverse ribs $h'$ and $h$.

5. In combination with the disk Z having the radial tubes $d'$ and the enlarged hollow gudgeon; disk Z' also provided with a hollow gudgeon and connected with disk Z; the cell bars; a shaft $f$ passing through the disks; and an abrading cylinder and a brush carried by the shaft.

In witness whereof I have hereunto set my hand in presence of two witnesses.

JOSEF WINTER.

Witnesses:
GEO. H. MURPHY,
PAUL FISCHER.